(12) United States Patent
Marr

(10) Patent No.: US 8,516,024 B2
(45) Date of Patent: *Aug. 20, 2013

(54) ESTABLISHING THREAD PRIORITY IN A PROCESSOR OR THE LIKE

(75) Inventor: Deborah T. Marr, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/250,175

(22) Filed: Sep. 30, 2011

(65) Prior Publication Data

US 2012/0023502 A1    Jan. 26, 2012

Related U.S. Application Data

(63) Continuation of application No. 09/490,172, filed on Jan. 22, 2000, now Pat. No. 8,041,754.

(51) Int. Cl.
| | |
|---|---|
| *G06F 12/00* | (2006.01) |
| *G06F 17/30* | (2006.01) |
| *G06F 7/38* | (2006.01) |
| *G06F 9/46* | (2006.01) |

(52) U.S. Cl.
USPC .................. 707/899; 712/228; 718/103

(58) Field of Classification Search
USPC ............... 707/899; 710/260, 266; 712/228
See application file for complete search history.

(56) References Cited

U.S. PATENT DOCUMENTS

| | | | | |
|---|---|---|---|---|
| 6,076,157 | A  * | 6/2000  | Borkenhagen et al. | 712/228 |
| 6,105,127 | A  * | 8/2000  | Kimura et al. | 712/215 |
| 6,339,808 | B1 * | 1/2002  | Hewitt et al. | 710/260 |
| 6,567,839 | B1 * | 5/2003  | Borkenhagen et al. | 718/103 |
| 7,694,055 | B2 * | 4/2010  | Orita et al. | 710/260 |
| 8,041,754 | B1 * | 10/2011 | Marr | 707/899 |

* cited by examiner

*Primary Examiner* — Susan Chen
(74) *Attorney, Agent, or Firm* — Kenyon and Kenyon LLP

(57) ABSTRACT

In a multi-threaded processor, one or more variables are set up in memory (e.g., a register) to indicate which of a plurality of executable threads has a higher priority. Once the variable is set, several embodiments are presented for granting higher priority processing to the designated thread. For example, more instructions from the higher priority thread may be executed as compared to the lower priority thread. Also, a higher priority thread may be given comparatively more access to a given resource, such as memory or a bus.

16 Claims, 4 Drawing Sheets

ESTABLISHING THREAD PRIORITY IN A PROCESSOR OR THE LIKE

RELATED APPLICATIONS

The present application is a continuation of Ser. No. 09/490,172 filed on Jan. 22, 2000 (now U.S. Pat. No. 8,041,754).

BACKGROUND OF THE INVENTION

The present invention pertains to the operation of a processor or the like. More particularly, the present invention pertains to establishing priority of a thread in a multi-threaded processor.

As is known in the art, a processor includes a variety of sub-modules, each adapted to carry out specific tasks. In one known processor, these sub-modules include the following: an instruction cache, an instruction fetch unit for fetching appropriate instructions from the instruction cache; decode logic that decodes the instruction into a final or intermediate format, microoperation logic that converts intermediate instructions into a final format for execution; and an execution unit that executes final format instructions (either from the decode logic in some examples or from the microoperation logic in others).

Programming code to be executed by the processor can sometimes be broken down into smaller components referred to as "threads." A thread is a series of instructions whose execution achieves a given task. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing.

In some multi-threaded processors, the processor may switch between execution of two or more threads. In other multi-threaded processors, the threads may be executed simultaneously. In either of these processors, there is no delineation between how the threads are treated. In particular, code from one thread is given the same priority as code from another thread. This could lead to a negative impact on overall system performance, especially when execution of critical code is suspended or slowed by the execution of non-critical code.

In view of the above, there is a need to establish priority between two or more threads.

SUMMARY OF THE INVENTION

This and other needs are satisfied by embodiments of the present invention. In one embodiment, a method of establishing thread priority in a processor is presented where a value in memory is assigned to indicate which of a plurality of threads has a higher priority.

DETAILED DESCRIPTION

Figure 1:
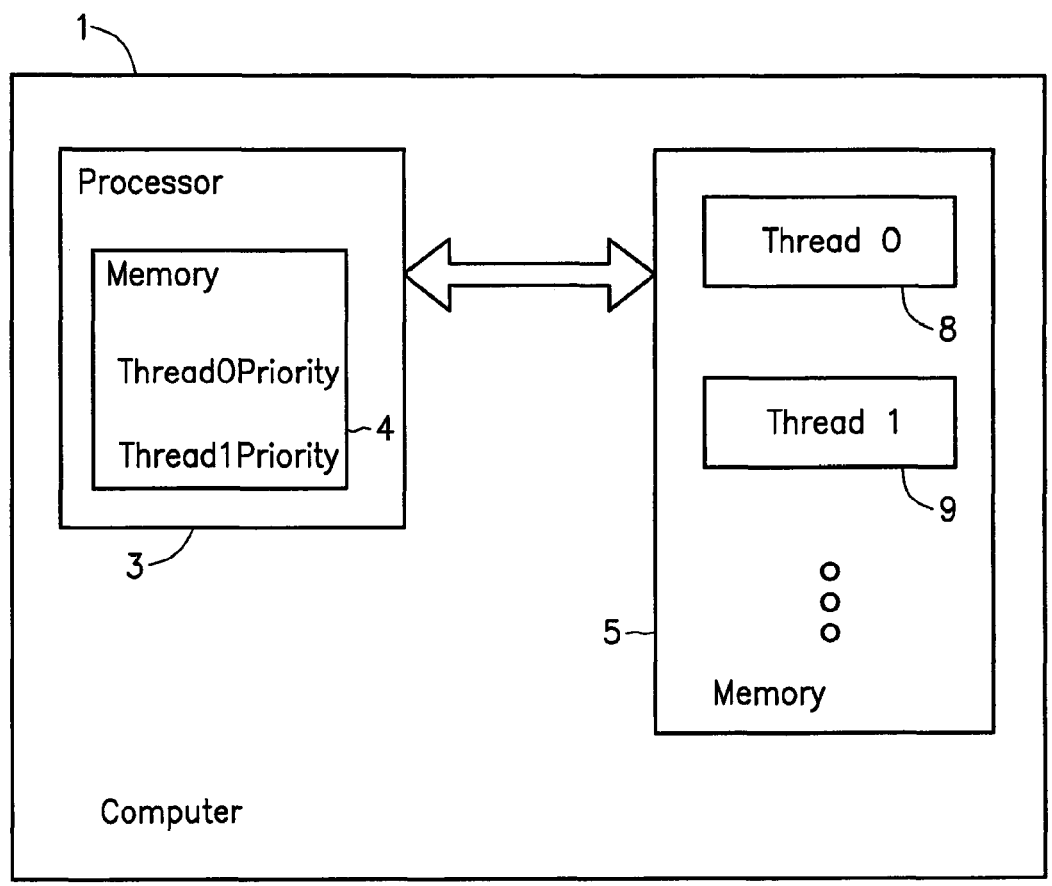
FIG. 1 is a block diagram of a computer system operated according to an embodiment of the present invention.

Referring to FIG. 1 a block diagram of a computer system operated according to an embodiment of the present invention is shown. In this example the computer system 1 includes a processor 3 which is capable of executing code stored in memory 5. In this example, memory 5 stores code for several threads, such as code for thread 0 (8), thread 1 (9), etc. As known in the art, code for two threads may be part of user applications and for the operating system.

Figure 2:
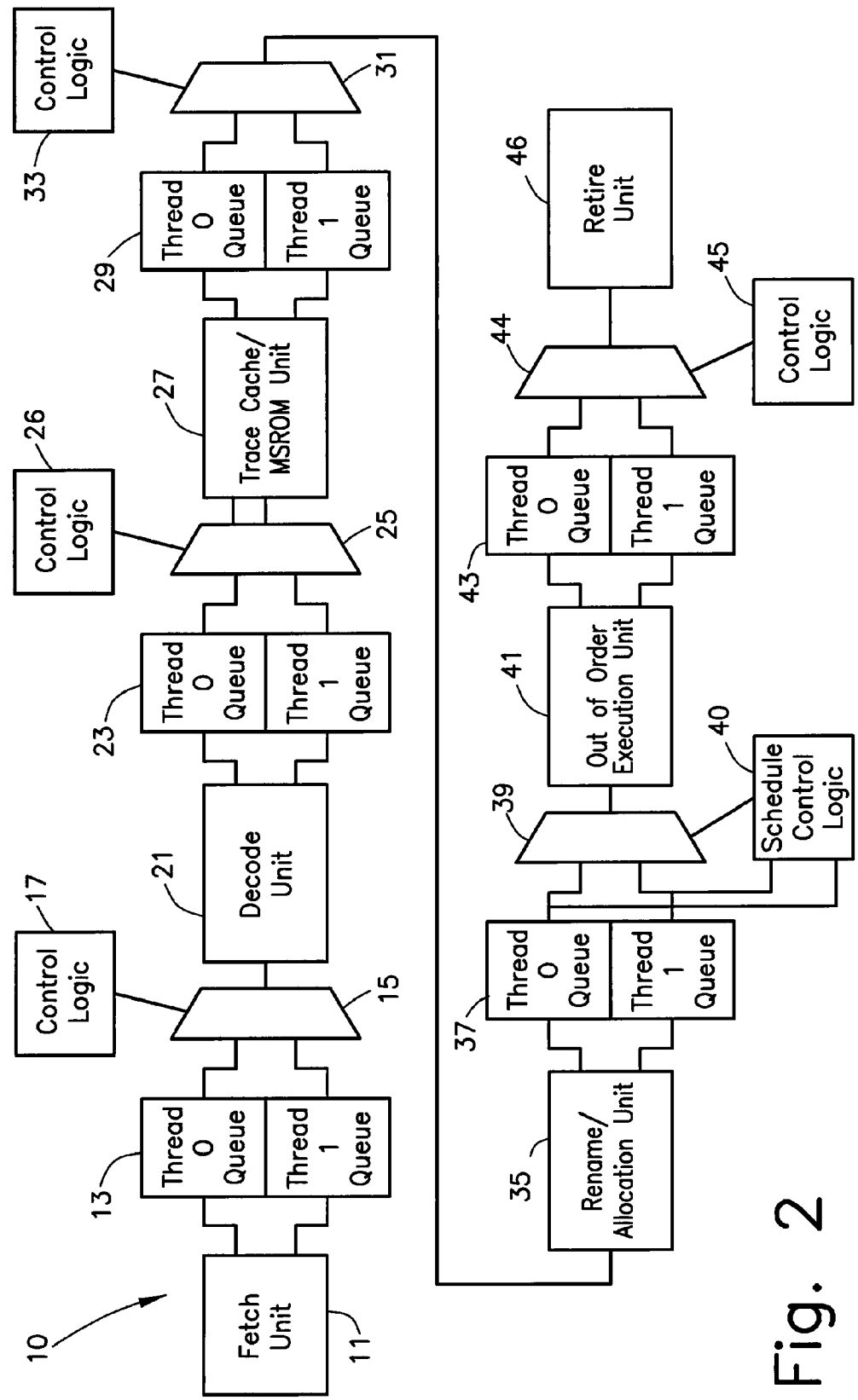
FIG. 2 is a block diagram of a portion of a processor system constructed according to an embodiment of the present invention.

Referring to FIG. 2, a block diagram of a processor system (e.g., a microprocessor, a digital signal processor, or the like) operated according to an embodiment of the present invention is shown. In this embodiment, the processor is a multi-threaded processor where the execution unit 41 is theoretically divided into two or more logical processors. As used herein, the term "thread" refers to an instruction code sequence. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. In this example, there are one or more execution units (e.g., including execution unit 41), which may execute one or more instructions at a time. The processor system 10, however, may be treated as two logical processors, a first logical processor executing instructions from the first thread and a second logical processor executing instructions from the second thread.

In this embodiment of the processor system 10, instructions and/or bytes of data are fetched by fetch unit 11 and supplied to a queue 13 and stored as part of the thread 0 queue or the thread 1 queue. One skilled in the art will appreciate that the queues used in processor system 10 may be used to store more than two threads. Instructions from the two threads are supplied to a mulitplexer (MUX) 15, and control logic 17 is used to control whether instructions from thread 0 or thread 1 are supplied to a decode unit 21. Decode unit 21 may convert an instruction into two or more microinstructions and supplies the instructions to queue 23 (in a RISC (reduced instruction set code) processor, the instructions may already be in a decoded format). The outputs of queue 23 are supplied to a MUX 25 which supplies instructions from thread 0 or thread 1 to a trace cache/MSROM (microsequencer read only memory) unit 27 based on operation of control logic 26. The trace cache/MSROM unit supplies instructions to a queue 29. The outputs of queue 29 are supplied to a MUX 31 which supplies instructions from thread 0 or thread 1 to a rename/allocation unit 35 based on operation of control logic 33. The rename/allocation unit 35, in turn, supplies instructions to queue 37. MUX 39 selects between the thread 0 queue and the thread 1 queue based on the operation of schedule control logic 40, which also receives the same inputs as MUX 37. The output of MUX 39 is supplied to an out of order execution unit 41 which executes the instruction. The instruction is then placed in queue 43. The outputs of queue 43 are supplied to a MUX 44 which sends instructions from thread 0 and thread 1 to a retire unit 46 based on the operation of control logic 45.

In FIG. 2, branch prediction circuitry may be added to assist in the efficiency of processor system 10. As known in the art, branch prediction concerns predicting based on past history of execution code sequences, for example, whether a branch instruction (e.g., BNE—Branch if Not Equal) will be taken. Once a branch has been predicted, the next instructions can be loaded into the "pipeline" (i.e., the units leading up to the execution unit 41), so that if the branch is taken as predicted, the appropriate instructions are immediately available for the execution unit. If the branch prediction is incorrect, then the instructions in the pipeline are incorrect and must be flushed out and the appropriate instructions loaded into the pipeline.

According to an embodiment of the present invention, an operating system that supports multiple thread execution may set one or more bit flags in memory (e.g., memory 4 provided in processor 3) to indicate that a particular thread is to be given priority over another. For example the lower four bits of the APIC (Advanced Programmable Interrupt Controller) TPR (Task Priority Register) Register for each thread may be used to set thread priority. The operating system may access the APIC TPR when it schedules a task for processing. The upper four bits of the APIC TPR register are used by the operating system to set priority as between interrupts. The setting of the lower four bits in the APIC TPR register serves as a hint to the processor system that one or more threads are to be given a higher priority in using the processor resource. Determining which thread is to be given priority is application specific. As an example, in a video conferencing application including code for processing video and audio data, the operating system may assign a higher priority to threads from either the video or audio data processing code rather than threads from the other data processing code. In this embodiment of the present invention the variable or flag Thread0Priority (e.g., the lower four bits of thread 0's APIC TPR register) in memory 4 is set to a higher value if thread 0 is to be given a higher priority than other threads and variable or flag Thread1Priority (e.g., the lower four bits of thread 1's APIC TPR register) in memory 4 is set to a higher value if thread 1 is to be given a higher priority than other threads. The four bits will be set to the same value if the threads are to be given the same priority.

According to an embodiment of the present invention, the setting of the priority bits or flags allows processing of one thread to take precedence over other threads of lower priority value. Threads of the same value are given the same priority. As a first embodiment of the present invention, control logic 17, 26, 33, 40, and 45 may be used to select which thread is given access to the next stage of processing. For example, control logic 17 may be used to select how many instructions from each thread are to be forwarded to decode unit 21 (based on the values stored in flags Thread0Priority and Thread1Priority). The length of the instruction, in bytes, depends on what type of processor is being used. For a RISC (Reduced Instruction Set Code) processor, each instruction is typically one byte. For a CISC (Complex Instruction Set Code), the instruction may be one to fifteen bytes or longer (e.g., for example the IA-32 architecture processors of Intel Corporation, the maximum instruction length is 15 bytes long). For a CISC instruction, the decode unit 21 may decode the instruction into a number of microinstructions (e.g., a one byte CISC instruction may be decoded into three microinstructions).

In this example, two threads are shown, though the invention is not so limited. If the threads are to be treated without assigning a priority to either one, then one method for handling instructions from each thread is to retrieve a predetermined number, X, of instruction bytes from a first thread then continue to retrieve bytes from the first thread until a taken branch in the code (i.e., based on a branch prediction unit) or some other set number of instruction bytes, whichever comes first. When reaching this point for the first thread, then the control logic switches to the other thread for processing in a similar manner.

Figure 3:
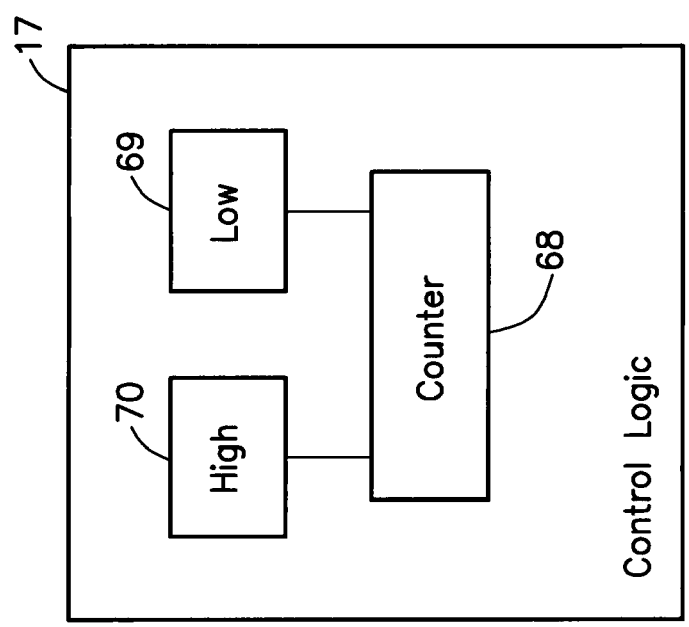
FIG. 3 is a block diagram of a portion of a processor system constructed according to an embodiment of the present invention.

According to this embodiment of the present invention, the predetermined value may be set for each thread so as to give priority of processing to one thread over the other. Referring to FIG. 3, a free-running timer or down-counter 68 is provided that is loaded, upon a thread switch, with either a first, low value 69 (e.g., 15), or a second, high value 70 (e.g., 30). Thus, if thread 0 is given a higher priority than thread 1, then when switching to the fetch of thread 0 instructions from queue 13, the high value is loaded into the counter 68, and when switching to the fetch of thread 1 instructions, the low value is loaded into the counter 68. Once counter 68 reaches zero, instructions are loaded into decode unit 21 from the current thread until a taken branch is reached or a preset number of additional instructions is reached; control logic 17 then switches to the next thread. The values for the high and low registers 69, 70 are freely programmable in this embodiment (e.g., through control registers). Referring to FIG. 2, if thread 0 is assigned a higher priority and instructions from this thread are being loaded from a source other than queue 13, then the priority feature shown in FIG. 3 may be disabled so that instructions from the lower priority thread can be fetched and decoded without interruption if desired. Also, if no instructions or bytes are available for a high priority thread, then instructions or bytes could be loaded from the lower priority thread so as to not degrade efficiency of the processor system. In other words, threads of lower priority may be given greater access to a resource compared to a thread with a higher priority when the higher priority thread is not using the resource.

As stated above, each control logic may be used to control which thread will be given access to a particular unit or resource in the processor system. The use of control logic 17 to control which thread supplies instructions or bytes to decode unit 21 is one example of many for this embodiment of the present invention. For instance, control logic 33 may be used to control the number N of instructions that are provided from each thread from queue 29 of the trace cache/MSROM unit to the rename allocation unit 35.

The present invention can be extended to other aspects of a computer system. For example, access to a cache memory may be controlled so that a higher priority thread is given greater access to the cache (e.g., by assigning more ways in the cache to the higher priority thread). If there is a resource that includes six buffers, then four of these buffers may be assigned to the high priority thread and two assigned to the low priority thread to increase performance of the high priority thread. An example of assigning priority access to a cache is shown in pending application Ser. No. 09/224,377 filed on Dec. 31, 1998.

Figure 4:
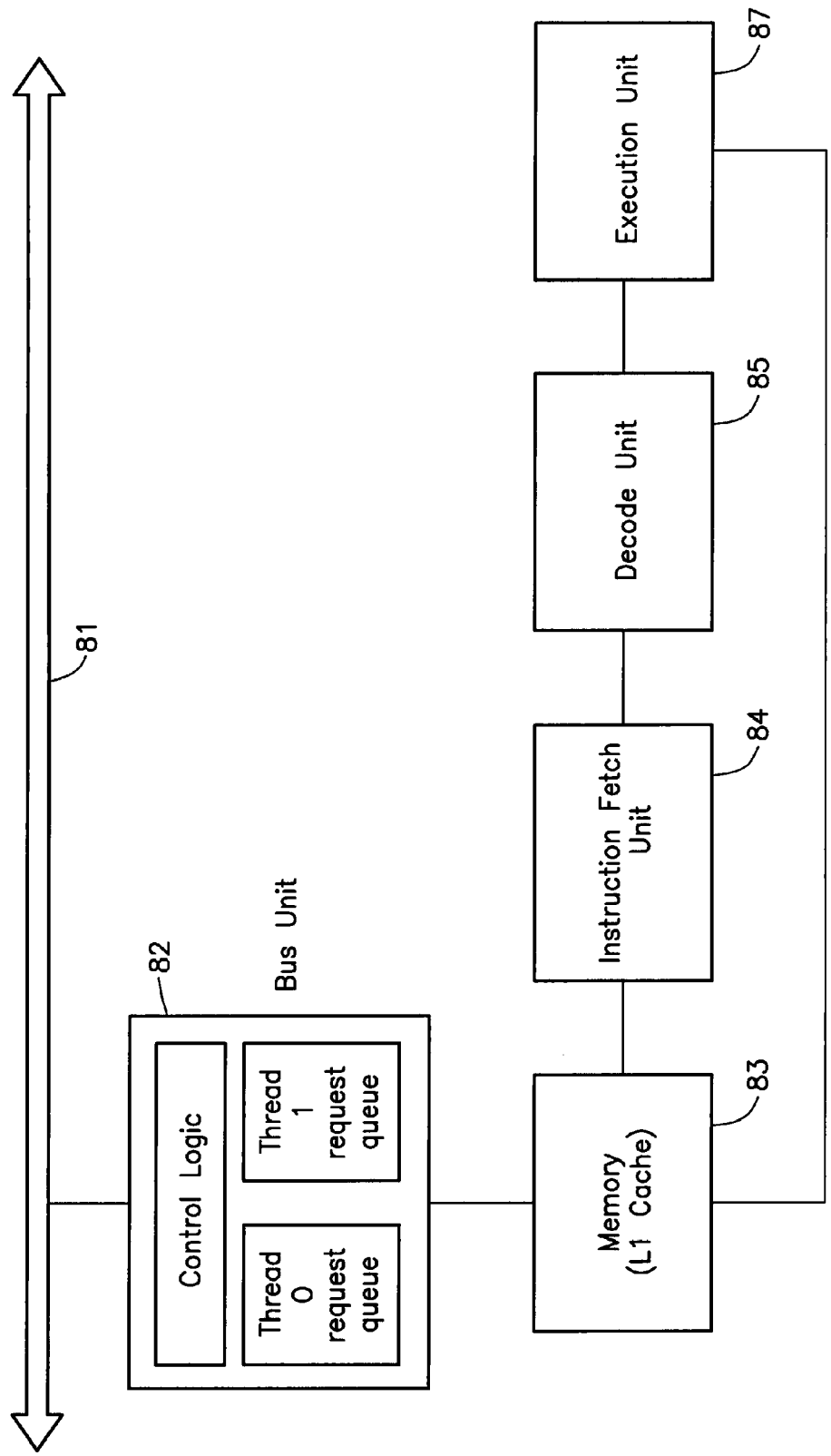
FIG. 4 is a block diagram of a bus system constructed according to an embodiment of the present invention.

Also, to the extent thread execution requires use of a bus or results in use of a bus, the indication of thread priority may be used to provide more access to the higher priority thread. Thus, in this case the shared resource between thread execution is a bus. For example, referring to FIG. 4, a processing system includes a memory (L1 cache) 83 coupled to an instruction fetch unit 84. The instruction fetch unit provides instructions or bytes of data to decode unit 85, which in turn is coupled to execution unit 87. Execution unit 87 is coupled to memory 83. Memory 83 is further coupled to bus 81 via a bus unit 82. Bus unit 82 includes a thread 0 request queue and a thread 1 request queue. According to an embodiment of the present invention, control logic in bus unit 82 controls which bus requests by threads 0 and 1 are transacted on bus 81 (e.g., a system bus). For example, the control logic may alternate between five consecutive accesses to thread 0 and two consecutive accesses to thread 1 when thread 0 has a higher priority (e.g., by setting the appropriate flag in memory as described above). The number of bus access assigned to high and low priority threads may be freely programmable by the user-application, for example.

Using thread priority as described above allows an increase in performance for the execution of varied applications. Assigning a higher priority to code that requires faster, timely execution, results in a better distribution of the processor resource to the applications using it.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method of establishing thread priority in a processor comprising:
   assigning a priority value in a memory to indicate which of a first and second threads has a higher priority;
   providing said first thread access to a resource, wherein said resource is selected from a group consisting of: a decode unit, a trace cache/MSROM, a rename/allocation unit, an execution unit, a retire unit, and a bus;
   selecting first and second counter values based on the priority value in the memory;
   based on a first counter operation to the first counter value, switching access to the resource from the first thread to the second thread;
   based on a second counter operation to the second counter value, switching access to the resource from the second thread to the first thread;
   selecting a first number and a second number based on said priority value in the memory;
   supplying said first number of instructions to the resource from a first thread; and
   supplying said second number of instructions to the resource from a second thread;
   wherein said first counter value is higher than said second counter value, and the first and second counter operations are performed using at least one of a free-running timer and a down-counter.

2. The method of claim 1 further comprising:
   changing priority assigned to each thread by changing the priority value in the memory to indicate that the second thread has a higher priority than the first thread.

3. The method of claim 1, wherein the second thread is given greater access to the resource than the first thread when said first thread is assigned a higher priority than the second thread and is not using said resource.

4. The method of claim 3 wherein said resource is a unit in a processor system.

5. The method of claim 4 further comprising:
   providing instructions from said first thread to a first queue;
   providing instructions from said second thread to a second queue;
   supplying said first number of instructions to said resource from said first queue;
   supplying said second number of instructions to said resource from said second queue.

6. The method of claim 3 wherein said resource is a bus.

7. The method of claim 6 further comprising:
   providing bus requests from said first thread to a first queue;
   providing bus requests from said second thread to a second queue;
   servicing said first number of bus requests from the first queue;
   servicing said second number of bus requests from said second queue.

8. The method of claim 1 wherein assigning a priority value in the memory includes assigning a value in an APIC TPR register for a thread via execution of operating system code to indicate which of the first and second threads has a higher priority.

9. An apparatus for establishing thread priority in a processor comprising:
   a memory to store a priority value to indicate which of a first and second threads has a higher priority;
   a controller to select first and second counter values based on said priority value and to provide said first thread access to a resource, wherein said resource is selected from a group consisting of: a decode unit, a trace cache/MSROM, a rename/allocation unit, an execution unit, a retire unit, and a bus;
   a counter to perform a counter operation wherein if said first thread has a higher priority than said first thread, said controller is to switch access to the resource from the first thread to the second thread based on the counter operation to the first counter value and to subsequently switch access to the resource from the second thread to the first thread based on the counter operation to the second counter value wherein the first counter value is higher than the second counter value; and
   control logic coupled to said resource, said control logic to permit a first number of instructions of the first thread to be transferred to said resource, a second number of instructions of the second thread to be transferred to said resource, said first and second numbers being selected based on said priority value in the memory;
   wherein the counter comprises at least one of a free-running timer and a down-counter.

10. The apparatus of claim 9 wherein the second thread is given greater access to the resource than the first thread when said first thread is assigned a higher priority than the second thread and is not using said resource.

11. The apparatus of claim 10 wherein said resource is a bus.

12. The apparatus of claim 11 further comprising:
    a bus unit including
    a first queue storing bus requests from said first thread;
    a second queue storing bus requests from said second thread;
    the control logic coupled to said first and second queues, said control logic to control servicing of said first number of bus requests from the first queue, and said second number of bus requests from said second queue.

13. The apparatus of claim 9 wherein said resource is a unit in a processor system.

14. The apparatus of claim 13 further comprising:
    a first queue to store instructions from said first thread;
    a second queue to store instructions from said second thread;
    the control logic coupled to said first and second queues, said control logic to permit said first number of instructions to be transferred from said first queue to said resource, and said second number of instructions to be transferred from said second queue to said resource.

15. The apparatus of claim 9 wherein said memory further includes
an APIC TPR register for a thread wherein execution of operating system code causes a value to be stored in said register to indicate which of a plurality of threads has a higher priority.

16. A processor establishing thread priority comprising:
a memory to store a priority value to indicate which of a first and second threads has a higher priority;
a controller to select first and second counter values based on said priority value and to provide said first thread access to a resource, wherein said resource is selected from a group consisting of: a decode unit, a trace cache/MSROM, a rename/allocation unit, an execution unit, a retire unit, and a bus;
a counter to perform a counter operation, wherein if said first thread has a higher priority than said first thread, said controller is to switch access to the resource from the first thread to the second thread based on the counter operation to the first counter value and to subsequently switch access to the resource from the second thread to the first thread based on the counter operation to the second counter value wherein the first counter value is higher than the second counter value; and
control logic coupled to said resource, said control logic to permit a first number of instructions of the first thread to be transferred to said resource, a second number of instructions of the second thread to be transferred to said resource, said first and second numbers being selected based on said priority value in said memory;
wherein the counter comprises at least one of a free-running timer and a down-counter.

\* \* \* \* \*